United States Patent [19]

Couillard

[11] 4,305,220
[45] Dec. 15, 1981

[54] ARTIFICIAL FISH

[76] Inventor: David L. Couillard, 5804 W. 26th St., Cicero, Ill. 60650

[21] Appl. No.: 154,328

[22] Filed: May 29, 1980

[51] Int. Cl.³ .............................................. A01K 85/02
[52] U.S. Cl. .................................................. 43/42.48
[58] Field of Search ........................................ 43/42.48

[56] References Cited

U.S. PATENT DOCUMENTS 2,525,733 10/1950 Suick ............................... 43/42.48 X
2,766,546 10/1956 Dodge ................................ 43/42.48
4,189,860 2/1980 Ebert ............................... 43/42.48 X

FOREIGN PATENT DOCUMENTS 567717 12/1958 Canada ................................ 43/42.48

Primary Examiner—Jimmy C. Peters
Attorney, Agent, or Firm—John H. Shurtleff

[57] ABSTRACT

An artificial fish bait of the jerk bait class having an elongated tailing portion with a flat belly behind a much shorter head portion having a longitudinal arcuate recess on its underside and a transverse arcuate recess on its upper side with a nose protruding to extend below the line of the flat belly. When pulled from the front end, the bait dives quickly and easily, and then rises gradually when the line pressure is released.

5 Claims, 5 Drawing Figures

ARTIFICIAL FISH

This invention relates to improvements in artifical fish baits, specifically designed in the jerk bait class, meaning the moment there is a jerk or pull on the line it causes the lure to dive immediately at a rapid rate.

An object of this invention is to provide an improved form of fish bait, being formed with an upper head, scooped out to catch water as the lure moves through the water causing pressure, while the lower head has an arcuate recess, causing water cavitation with less pressure.

Another object of this invention is the nose of the bait, so constructed as to extend one quarter of an inch below the bottom or belly of the lure for the purpose of instant deep diving.

A still further object of this invention is to provide an improved form of fish bait which is highly efficient in operation and relatively inexpensive to manufacture and produce.

Other objects will appear as the like characters of reference are used throughout the following specification and the accompanying drawings to designate corresponding parts which form a part of this application.

Figure 1:
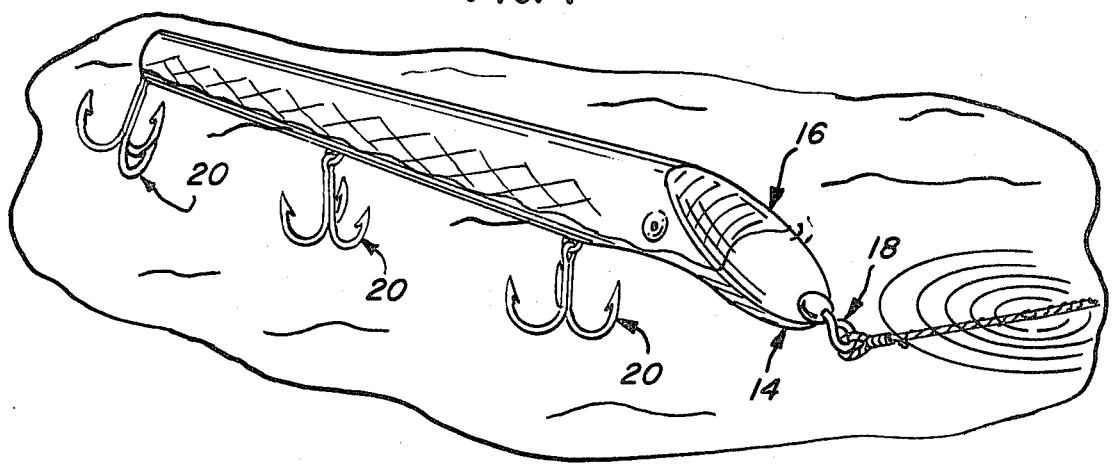
FIG. 1 is a view in perspective.
Figure 2:
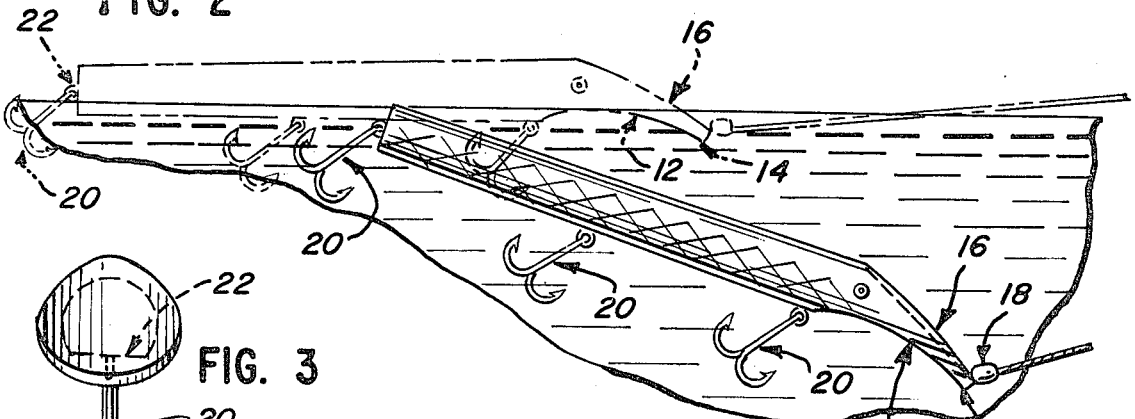
FIG. 2 is a side elevational view, illustrating the diving position of the lure, also, the (12) arcuate recess, the (16) scooped upper head and, the (14) protrusion of the nose, extending one quarter of an inch lower than the belly of the lure, which together with the upper head, causes the more rapid and immediate dive.
Figure 3:
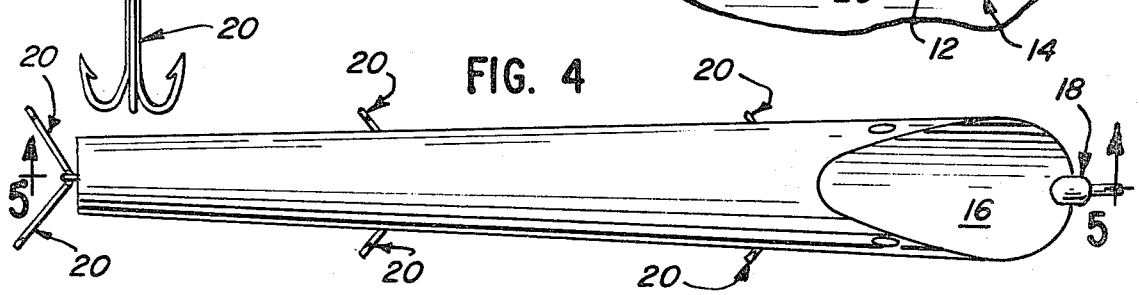
FIG. 3 is a front elevational view with a cross section (in broken lines) through the trailing end of the lure.
Figure 4:
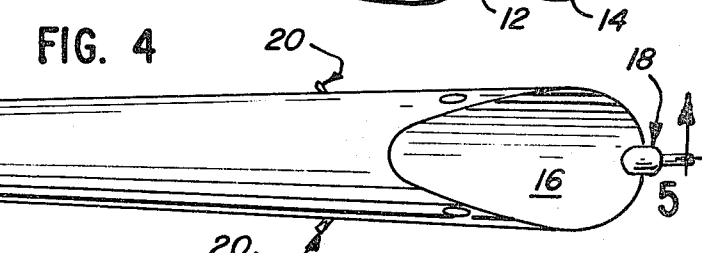
FIG. 4 is the top plan view of the lure.
Figure 5:
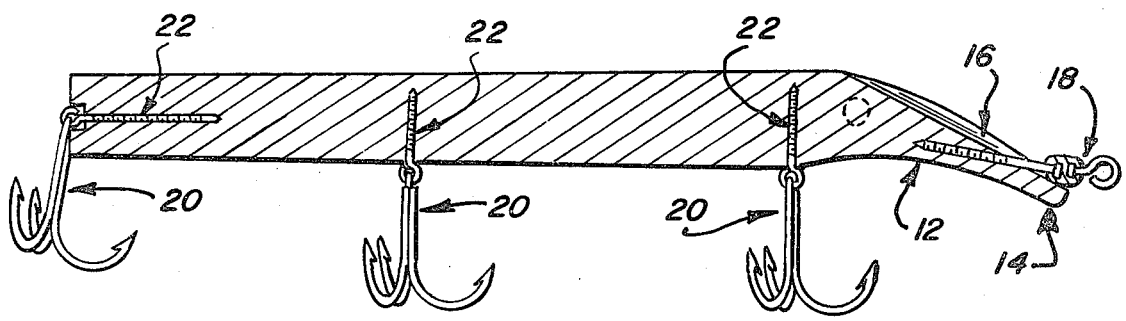

FIG. 5 is a longitudinal cross section on line 5—5 of FIG. 4 shows the head or forward end of the bait being (16) scooped on top and formed with (12) an undercut recess setback from the forwardmost portion of the bait to extend a considerable distance towards the rear and an (18) eye hook is supported at the forwardmost end of the bait for attaching a fish line thereto for pulling the bait through the water.

In carrying out the invention, there is provided an improved fish bait comprising of an elongated body generally the same being substantially wider than the thickness of the bait, tapering from the forward end to the rear end thereof.

A plurality of (20) multiple barbed hooks will be bent under the body of the lure, then screwed into the body (22) of the bait, thereby holding the hooks securely in position to suspend below the bait body and in spaced relation with each other.

In operation, the bait is worked by jerking upon the rod and fish line to which it is attached, and cause the bait to dive more rapid and immediate.

When pressure is let off the line, the bait rises slowly at an angle leaving the tail end of the bait lower than the rest of the lure so as to make a better target for the fish.

It will be understood that the fish bait may be constructed of either wood or plastic, weights may be added for ascent variations, and may be painted any desired color for attracting fish.

From the foregoing description, it should also be understood that the (16) scooped upper head together with the (12) lower head or recess in the head of the bait is so constructed to cause the bait to nosedive when it is pulled or jerked, simulating the action of a wounded minnow or other live bait, thus quickly attracting fish of various types which will readily take the bait.

May it further be understood that this lure has been devised to provide a highly efficient form of fish bait, having no need for adjustments, so as not to depart from the spirit of the invention.

What is claimed is:

1. An artificial fish bait adapted to dive immediately and rapidly when jerked by a line attached at the front end thereof and then to rise slowly when the line pressure is released, said bait comprising:

an elongated body of greater width than thickness, tapering slightly from the forward end to the rear end thereof, and having a head portion at the forward end and a much longer trailing end portion which, in cross section, presents a flat belly extending along the bottom of the bait, said head portion being formed with (1) a nose which protrudes at the front end of the bait to extend a short distance below a line extended forwardly from the flat belly at the bottom of the bait, (2) a transverse concave recess in which the upper part of the head slants from said nose upwardly and rearwardly to the top of the bait, and (3) an arcuate recess in the bottom part of the head extending from said nose first upwardly and rearwardly and then downwardly and rearwardly to meet the bottom of said trailing end portion of the bait;

a multiple of barbed hooks secured to the body of the bait in spaced relation along the trailing end portion to be suspended therebelow; and means to attach a line to said head at the forward end of said bait.

2. An artificial fish bait as claimed in claim 1 wherein said trailing end portion of the elongated body has a rounded upper part above said flat belly as viewed in cross section.

3. An artificial fish bait as claimed in claim 1 wherein weights including said barbed hooks are so arranged that the bait, when the line pressure is released, rises slowly at an angle leaving the rear end of the bait lower than the rest of the bait.

4. An artificial fish bait as claimed in claim 1 wherein said means to attach a line includes an eye hook supported so as to be positioned at the forwardmost end of the bait.

5. An artificial fish bait as claimed in claim 1, 2, or 3 wherein said means to attach a line includes an eye hook mounted on the transverse concave recess of the head at the front end of the bait.

* * * * *